Figure 1:
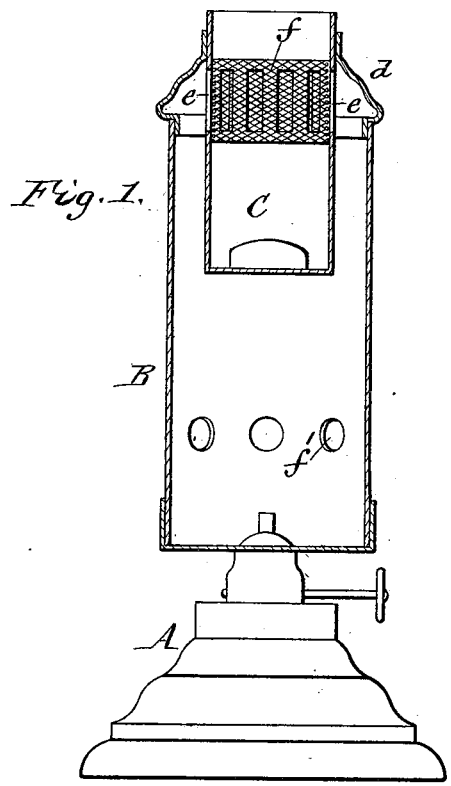

No. 630,782. Patented Aug. 8, 1899.
A. SCHMIDT.
DISINFECTING BY MEANS OF FORMALDEHYDE.
(Application filed Mar. 30, 1897.)

(No Model.)

Witnesses:
Henry L. Deck
Chas. F. Burkhart

Albrecht Schmidt Inventor
By Wilhelm & Bonner
Attorneys.

THE NORRIS PETERS CO., PHOTO-LITHO., WASHINGTON, D. C.

UNITED STATES PATENT OFFICE.

ALBRECHT SCHMIDT, OF BERLIN, GERMANY, ASSIGNOR TO CHEMISCHE FABRIK AUF ACTIEN, VORMALS E. SCHERING, OF SAME PLACE.

DISINFECTING BY MEANS OF FORMALDEHYDE.

SPECIFICATION forming part of Letters Patent No. 630,782, dated August 8, 1899.

Application filed March 30, 1897. Serial No. 630,013. (No model.)

*To all whom it may concern:*

Be it known that I, ALBRECHT SCHMIDT, a citizen of the German Empire, residing at Muellerstrasse 170 and 171, Berlin, in the German Empire, have invented certain new and useful Improvements in Disinfecting by Means of Formaldehyd and Apparatus Therefor, of which the following is a specification.

This invention relates to the disinfection of inclosed spaces of considerable size, such as sick-rooms, stables, &c., by formaldehyd gas or vapor.

Heretofore many attempts have been made to provide a satisfactory method of disinfecting rooms, stables, &c., by formaldehyd or formicaldehyde, but without signal success. For instance, it has been proposed to liberate formaldehyd gas or vapor by heating solutions of formaldehyd. In heating a watery solution the polymerization of the formaldehyd occurs when the concentration of the solution exceeds fifty per cent. and a precipitation of solid paraformaldehyd takes place. If the heating is continued, a solid deposit accumulates on the bottom of the evaporating vessel, which finally takes fire. Recently it has been attempted to overcome this difficulty by heating a solution of formaldehyd in methyl alcohol. This method presents other serious difficulties, because the spattering of the solution which occurs during heating is objectionable, particularly when it strikes persons, and because the evaporation of considerable quantities of methyl alcohol is not without danger, while the polymerization of formaldehyd is not entirely avoided and the evaporation of the expensive methyl alcohol represents a considerable loss. Another method consists in generating formaldehyd gas or vapor in the rooms to be disinfected by the oxidation of methyl alcohol. A number of different lamps have been produced for this purpose, but the practical results on a large scale have not been satisfactory, which is not surprising when it is considered that the oxidation occurs by means of incandescent platinum wires and that the yield of active aldehyd amounts to but a small percentage of the methyl alcohol used, as by far the greater portion of the same is oxidized to carbon monoxid and carbon dioxid. Better results have been attained by superheating a solution of formaldehyd under a pressure of about three atmospheres. In this process the precipitation of paraformaldehyd is prevented by the addition of calcium chloride. The apparatus required for this process is necessarily cumbersome and expensive, and not of such a character that it can be used by persons having no special knowledge of the subject.

The object of my invention is to produce economically a large yield of a permanent formaldehyd gas or vapor by a method which is so simple and safe that it can be practiced by persons of ordinary intelligence and which is practically efficient for destroying the disease germs existing in inclosures of considerable size, such as sick-rooms, stables, &c. When dry paraformaldehyd or other polymeric formaldehyd—for instance, trioxymethylen—is heated, for instance, upon a metal plate or in a metal tube, it disassociates to formaldehyd. At a certain distance from the point at which the heat is applied the vapor becomes repolymerized or condensed to polymeric formaldehyd, because formaldehyd gas, which exists at a temperature of 180° centigrade, condenses to polymeric formaldehyd when its temperature falls to about 170° centigrade. It is therefore impossible to diffuse formaldehyd in a room by simply heating paraformaldehyd, and, furthermore, the disinfecting effect produced by dry formaldehyd gas is insignificant and of no practical value. Formaldehyd gas combined with watery vapor is, on the other hand, an energetic disinfectant, although it has no injurious effect on higher organizations. In order to prevent the repolymerization of the formaldehyd vapors generated from paraformaldehyd or other polymeric formaldehyd and in order to produce an efficient sterilizing action, it is necessary to combine with the formaldehyd gas a certain amount of water in the form of vapor. My method and apparatus are designed to do this in a simple and automatic manner.

Figure 2:
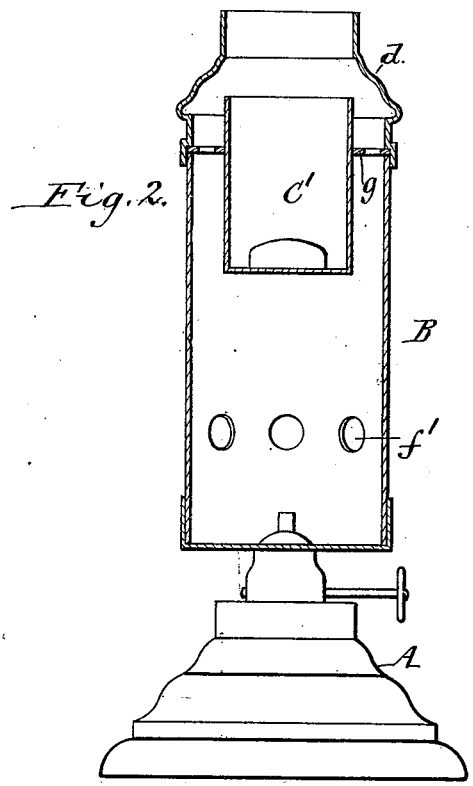
Figure 3:
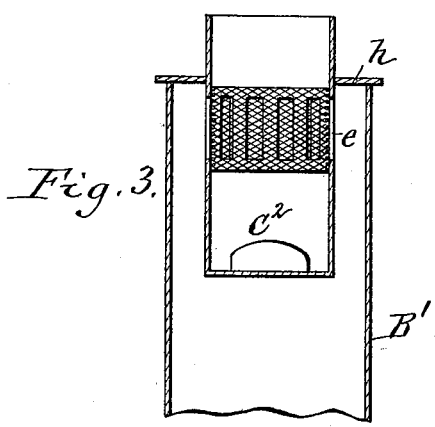
Figure 4:
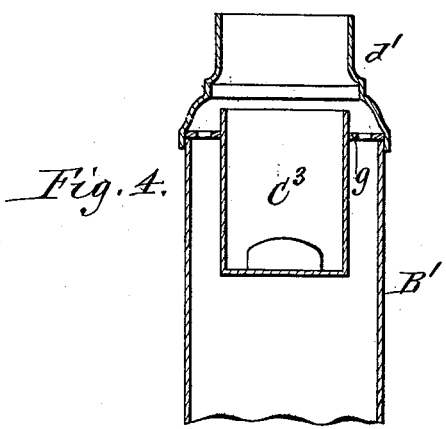

In the accompanying drawings, Figure 1 is a sectional elevation of a lamp for practicing my method of disinfection. Figs. 2, 3, and 4 are vertical sections showing modifications of the apparatus.

Like letters of reference refer to like parts in the several figures.

Referring to Fig. 1, A represents a lamp, and B an upright chimney or cylinder mounted on the same. C represents a receptacle of cylindrical or other suitable form, somewhat smaller in diameter and arranged in the upper portion of the chimney B. This receptacle is closed at the bottom and side, except near its top, at a short distance below the top $d$ of the chimney, where the receptacle is provided with an annular row of openings or slots $e$. These openings are covered with wire-gauze $f$ of sufficient fineness to prevent the passage of a flame through the same. The top $d$ of the chimney extends inwardly to the side of the receptacle and supports the latter and directs the gases from the chimney into the upper portion of the receptacle. The chimney is provided at or near its bottom with openings for the admission of air to the flame of the lamp—for instance, as shown at $f$. The lamp is preferably an alcohol-lamp; but instead of alcohol any other fuel may be employed which produces gaseous products of combustion rich in watery vapor—for instance, liquid hydrocarbons or gas. The paraformaldehyd or other polymeric formaldehyd is placed in the receptacle C, preferably in the form of highly-compressed tablets. The hot products of combustion flowing upwardly through the chimney heat the receptacle and generate formaldehyd vapor from the polymeric formaldehyd contained therein. These vapors in rising from the receptacle encounter the hot and moist products of combustion which pass into the upper portion of the receptacle from the chimney through the openings $e$. These products of combustion supply the necessary percentage of watery vapor steadily and automatically and in a fine state of division to the formaldehyd vapor and render the latter permanent and prevent its repolymerization and combine with it to form an efficient disinfecting agent, while the large volume of other gaseous products of combustion and air, on which these watery vapors are carried, causes a diffusion of the formaldehyd vapor in this outflowing current of hot gases and a thorough diffusion of the formaldehyd vapor or gas in the room or other inclosure in which the apparatus is placed. The sizes and proportions of the parts are such that the temperature of the products of combustion when they join the formaldehyd vapor is below the point of ignition of the latter, while the passage of a flame from the chimney into the receptacle is prevented in any event by the fine wire-gauze which covers the openings in the receptacle. Asbestos or other suitable material may be placed in the receptacle to moderate the heating effect. As an illustration of the action of this apparatus I may state that to evaporate one gram of polymeric formaldehyd about three grams of alcohol are required. This quantity of alcohol produces about three and one-half grams of water and nearly nine grams of carbon dioxid. Besides this quantity of watery vapor and carbon dioxid a large volume of air is also mixed with the formaldehyd vapor, so that a very minute distribution or division of the vapor is obtained, which thoroughly combines the watery vapor with the formaldehyd vapor and which thoroughly diffuses the resultant permanent formaldehyd vapor or gas through the room or other inclosure.

I prefer to use the polymeric formaldehyd in the form of highly-compressed tablets, not only because this form is most convenient for measuring the desired quantity for a charge, but mainly because the compact form and the spaces between the tablets when several are placed in the receiver tend to prevent the material from becoming overheated and taking fire and also facilitate the escape of the generated vapor.

In the construction of the apparatus represented in Fig. 2 the receptacle $C'$ is suspended within the upper portion of the chimney by a horizontal flange $g$, which is perforated for the passage of the products of combustion. The upper edge of the receptacle stands at a certain distance below the top $d$ of the chimney, so that this top deflects the ascending products of combustion inwardly over the receptacle and causes them to mingle with the vapor rising therefrom.

In the construction represented in Fig. 3 the receptacle $C^2$ is supported on the lamp or gas chimney $B'$ by an imperforate annular flange $h$, and the products of combustion enter the upper portion of the receptacle through the openings $e$, as in the construction represented in Fig. 1.

In the construction represented in Fig. 4 the receptacle $C^3$ is supported on the lamp or gas chimney $B'$ by a perforated flange $g$, as in Fig. 2, and the receptacle is constructed without openings, as in said figure, and carries an inwardly-extending top or hood $d'$, which directs the products of combustion over the receptacle.

It will thus be seen that by my improved process polymeric formaldehyd is evaporated and the gas or vapor generated thereby is combined with watery vapor in an automatic and exceedingly simple and safe way, which renders the process suitable for the disinfection of sick-rooms, stables, and other inclosures by persons of ordinary intelligence and which produces a disinfecting agent which is exceedingly effective and thorough and which has no injurious effects either upon persons or upon furniture, clothing, &c.

I claim as my invention—

1. The herein-described method of generating formaldehyd gas which consists in evaporating polymeric formaldehyd by means of hot gaseous products of combustion which contain watery vapor in sufficient proportion for combination with the evaporated formaldehyd and commingling said gaseous products of combustion with said evaporated formaldehyd, thereby producing a permanent formaldehyd gas of great disinfecting power, preventing the repolymerization of the polymeric formaldehyd and diffusing said formaldehyd gas by the escaping current of gaseous products of combustion, substantially as set forth.

2. The herein-described apparatus for evaporating polymeric formaldehyd and combining the generated gas with watery vapor consisting in the combination with a lamp-chimney which is closed at the top, of a receptacle for the polymeric formaldehyd arranged within said chimney, open at the top and provided in its side and below the closed top of the chimney with openings through which the gaseous products of combustion pass from the chimney inwardly into said receptacle, substantially as set forth.

In testimony whereof I have signed my name, in the presence of two subscribing witnesses, this 4th day of March, 1897.

ALBRECHT SCHMIDT.

Witnesses:
 HENRY HASPER,
 W. HAUPT.